(12) United States Patent
Alexander (10) Patent No.: US 7,797,105 B2
(45) Date of Patent: Sep. 14, 2010

(54) SYSTEM AND METHOD FOR GPS ACQUISITION USING ADVANCED TIGHT COUPLING

(75) Inventor: Steven B. Alexander, Orange, CA (US)

(73) Assignee: L-3 Communications Corporation, Anaheim, CA (US)

(*) Notice: Subject to any disclaimer, the term of this patent is extended or adjusted under 35 U.S.C. 154(b) by 93 days.

(21) Appl. No.: 12/193,449

(22) Filed: Aug. 18, 2008

(65) Prior Publication Data

US 2008/0309552 A1 Dec. 18, 2008

Related U.S. Application Data

(62) Division of application No. 11/413,632, filed on Apr. 28, 2006, now Pat. No. 7,415,354.

(51) Int. Cl.
*G01S 1/00* (2006.01)
(52) U.S. Cl. .......... 701/213; 342/357.15; 342/362; 342/357.06; 342/357.12; 455/455
(58) Field of Classification Search .......... 701/213; 342/357.15, 357.05, 362, 357.06, 365, 357.11, 342/357.12; 455/273, 277.1, 455; *G01S 1/00*
See application file for complete search history.

(56) References Cited

U.S. PATENT DOCUMENTS

| | | | | |
|---|---|---|---|---|
| 5,185,610 A | * | 2/1993 | Ward et al. | 342/357.11 |
| 5,268,927 A | * | 12/1993 | Dimos et al. | 375/147 |
| 5,373,531 A | * | 12/1994 | Kawasaki | 375/150 |
| 5,535,278 A | | 7/1996 | Cahn et al. | |
| 5,568,158 A | * | 10/1996 | Gould | 343/756 |
| 5,657,025 A | | 8/1997 | Ebner et al. | |
| 5,663,735 A | * | 9/1997 | Eshenbach | 342/357.15 |
| 5,666,122 A | * | 9/1997 | Carter | 342/357.15 |
| 5,893,044 A | * | 4/1999 | King et al. | 701/214 |
| 5,983,160 A | | 11/1999 | Horslund et al. | |
| 6,005,514 A | * | 12/1999 | Lightsey | 342/365 |
| 6,246,960 B1 | | 6/2001 | Lin | |
| 6,278,945 B1 | | 8/2001 | Lin | |
| 6,697,736 B2 | | 2/2004 | Lin | |
| 6,784,830 B1 | * | 8/2004 | Lawrence et al. | 342/357.12 |
| 6,842,498 B2 | * | 1/2005 | Heinzl et al. | 375/350 |
| 7,239,275 B2 | * | 7/2007 | Dybdal et al. | 342/362 |
| 2002/0120400 A1 | | 8/2002 | Lin | |
| 2004/0176102 A1 | * | 9/2004 | Lawrence et al. | 455/456.1 |

(Continued)

OTHER PUBLICATIONS

USPTO; Office Action dated Dec. 28, 2006, from related application U.S. Appl. No. 11/413,632, filed Apr. 28, 2006.

(Continued)

*Primary Examiner*—Tuan C To
(74) *Attorney, Agent, or Firm*—Knobbe Martens Olson & Bear LLP (57) ABSTRACT

A system and method for GPS acquisition in relatively high interference is described. Acquisition is aided by an Advanced Tightly Coupled (ATC) tracking filters that compute a satellite range residuals and range rate residuals for satellites being acquired. Multiple channels are used in parallel to search for the desired satellites. Range residuals from the ATC filters are used to correct the computed receiver offset and thus allow acquisition in the presence of relatively high interference.

14 Claims, 3 Drawing Sheets

U.S. PATENT DOCUMENTS

| | | |
|---|---|---|
| 2005/0200517 A1* | 9/2005 | Bloebaum et al. ...... 342/357.05 |
| 2006/0015250 A1 | 1/2006 | Kim |
| 2006/0022873 A1* | 2/2006 | Zimmerman ................ 342/464 |
| 2006/0202890 A1* | 9/2006 | Otto ........................... 342/362 |
| 2006/0227905 A1* | 10/2006 | Kunysz et al. .............. 375/345 |
| 2007/0075896 A1* | 4/2007 | Whitehead et al. ..... 342/357.11 |
| 2007/0096977 A1 | 5/2007 | Lillo et al. |
| 2007/0132639 A1* | 6/2007 | Korneluk et al. ............ 342/464 |

OTHER PUBLICATIONS

USPTO; Office Action dated Jun. 28, 2007, from related application U.S. Appl. No. 11/413,632, filed Apr. 28, 2006.

USPTO; Office Action dated Oct. 18, 2007, from related application U.S. Appl. No. 11/413,632, filed Apr. 28, 2006.

\* cited by examiner

SYSTEM AND METHOD FOR GPS ACQUISITION USING ADVANCED TIGHT COUPLING

CROSS-REFERENCE TO RELATED APPLICATION

This application is a divisional application of U.S. application Ser. No. 11/413,632, filed Apr. 28, 2006, now U.S. Pat. No. 7,415,354, issued on Aug. 19, 2008, the disclosure of which is incorporated by reference herein.

BACKGROUND OF THE INVENTION

1. Field of the Invention

The invention relates to a new method of combining GPS and navigation estimates to provide GPS acquisition in the presence of interfering signals.

2. Description of the Related Art

The Global Positioning System has revolutionized navigation. Prior to the twentieth century, land and sea navigation was performed using angle measurements to celestial bodies, magnetic compass measurements, and time measurements from an accurate clock to determine longitude. At the beginning of the twentieth century, the first airplane flight foreshadowed the need for more accurate navigation systems. Radio and inertial navigation systems soon supplanted the old methods.

The GPS concept was developed in the early 1970s as a joint military service project and the first satellite was launched in 1978. GPS satellites transmit time synchronized signals in the L frequency band (approximately 1.5 GHz) using atomic clocks. The signals are BPSK modulated by a spread spectrum ranging code and navigation message. The code, known to the user, is unique for each satellite. The navigation message contains data on satellite ephemeris and clock errors, atmospheric corrections, and general satellite almanac data.

A GPS navigator determines position with time-of-arrival measurements. The navigator correlates a replica of each satellite's code with the received satellite's signal. Accurate knowledge of the code transmit time from each satellite and the receive time at the navigator will determine pseudoranges, ranges which contain an offset because of navigator clock error. Four satellites are the minimum required for determination of a vehicle's three dimensional position and clock offset.

An inertial navigation system, INS, incorporates gyros and accelerometers mounted along three orthogonal axes to measure vehicle angular rates and specific force respectively. An INS measures short term vehicle dynamics and is, therefore, a perfect companion to GPS to achieve high dynamic and high accuracy vehicle navigation.

Standard GPS receivers employ tracking loops to generate pseudorange and delta pseudorange measurements for each satellite. The GPS signal at the vehicle's antenna is amplified, down converted, and digitized prior to entering the tracking loops. It is a composite signal, containing information from all visible satellites.

In each satellite tracking loop, the incoming carrier signal is mixed with a replica of the carrier to produce in-phase (I) and quadrature-phase (Q) signals with a small phase error. These Is and Qs are transformed into an explicit phase error signal, integrated, subsampled, filtered and fed to a numerically controlled oscillator to generate the replica carrier signal. This process is referred to as the carrier tracking loop.

An inner loop correlates the Is and Qs with on time, one half chip early, and one half chip late replica codes for the specific satellite being tracked. The Is and Qs are now only a function of the code correlation and phase error. These are transformed into an explicit pseudorange error signal, integrated, subsampled, filtered, and fed to a numerically controlled oscillator to clock the satellite replica code. This inner loop is referred to as the code tracking loop.

A major tracking loop design tradeoff is the ability to handle high vehicle dynamics and to also track through high interfering noise. One way of solving this problem is to aid the carrier tracking loop with an Inertial Navigation Unit (IMU) and let the carrier loop aid the code loop. The IMU will remove short term dynamics from the tracking loop and thus allow the loop bandwidth to be reduced. Lowering the bandwidth results in greater noise suppression.

The output of each satellite's tracking loop includes pseudorange and delta pseudorange measurements. These, along with satellite ephemeris and IMU measurements, are input to a navigation filter which estimates vehicle position, velocity, attitude, user clock parameters, and IMU error terms. In real-time systems, the navigation filter usually runs at a 1 Hz rate. It sends estimates to the IMU strapdown navigator, which corrects the IMU specific force and angular rate measurements and then integrates them to obtain high frequency trajectory estimates. The velocity estimates are projected along each satellite's line of sight for tracking loop aiding. This configuration is called a tightly coupled system.

Standard GPS carrier and code tracking loops, with aiding from a medium grade IMU, normally break lock at jamming to signal ratios of 47 and 57 dB respectively. For high dynamic vehicles, these maximum jamming ratios can be achieved by aiding the tracking loops with IMU data as described above.

Recently, jamming to signal ratios above 60 dB have been attained by closing the tracking loops through the navigation filter. This multi-satellite tracking loop structure is derived from the maximum likelihood estimate of the pseudorange error given the composite GPS signal at the input to the tracking processor. In this configuration, position and velocity estimates from the strapdown navigator are projected along each satellite's line of sight to generate range and range rate estimates to each satellite. These drive numerically controlled oscillators whose outputs are mixed with the digitized I and Q data, processed, and input to the navigation filter as residual (measurement—estimated measurement) estimates for each satellite. The navigation filter outputs vehicle trajectory and IMU error estimates to the strapdown navigator to close the multi-satellite tracking loop.

Because every GPS satellite tracking loop includes the navigation filter, each satellite is integrated with the IMU and other tracked satellites. In this mode the satellites aid each other, and with the IMU, generate a more robust navigation solution.

While the systems described above can track through substantial jamming, the problem of acquisition in the presence of jamming remains.

SUMMARY

These and other problems are solved by an Advanced Tightly Coupled (ATC) multi-satellite tracking system for acquisition and tracking in a high noise environment. Non-linear transformations of I and Q tracker measurements are developed to yield linear measurements of pseudorange and carrier phase errors corrupted by white, additive, and unbiased noise. The system's design parameters are provided by application of linear estimation theory, allowing it to be easily integrated into existing navigation filter designs.

In one embodiment, parallel time search during satellite acquisition is provided by allocating plurality of channels to each satellite being acquired. The various taps of each channel are distributed in time such that the plurality of channels work in parallel to provide relatively simultaneous search over more chips than can be searched by each channel working alone. In one embodiment, all available channels (and all taps) are configured to search for a single satellite. The taps are distributed according to a desired chip spacing centered at the expected range. In one embodiment, a first half of the available channels are configured to search for a first satellite and a second half of the available channels are configured to search for a second satellite. In one embodiment, a first group of the available channels are configured to search for a first satellite, a second group of the available channels are configured to search for a second satellite, a third group of the available channels are configured to search for a third satellite, etc. Once the desired satellites have been acquired, then the GPS system tracks the satellites. Range residuals from the advanced tight coupling filters are used to improve the acquisition process.

In one embodiment, during real-time operation, the system can handle jamming to signal interference ratios greater than 60 dB. In one embodiment, the system adapts to changing levels of interference and can operate without knowledge of the GPS navigation data bit. After initial GPS signal acquisition, it is possible to transition into the Advanced Tight Coupling mode, although standard tracking loops can still be employed at low jamming to signal ratios.

In one embodiment of the ATC multi-satellite tracking system, the navigation filter outputs vehicle trajectory estimates along with position error estimates based on dead-reckoning and/or IMU measurements, and user clock error estimates. In one embodiment, a Kalman filter is used to implement the navigation filter. In a real-time system, the greater the number of filter states, the less time will be available for the ATC tracking processor to function. In one embodiment, the navigation filter includes 24 states, and provides processing in less than one tenth of a second.

The navigation filter's error estimates used to correct the current trajectory estimates used by the strapdown and/or dead reckoning navigation equations to propagate the vehicle's state between the one second navigation filter's outputs. Satellite ephemeris data, which has been obtained from the navigation message, is combined with the vehicle's position and velocity estimates to determine range and range rate estimates to each satellite. These estimates drive carrier and code numerically controlled oscillators (NCO) to generate replica carrier and code signals.

The replica signals are mixed with the GPS carrier and code signals in a phase de-rotation and correlation process to produce in-phase (I) and quadrature-phase (Q) measurements. These measurements are nonlinear functions of the range measurement error and ambiguous carrier phase error. The carrier phase ambiguity refers to the unknown number of whole cycles from the satellite to the vehicle. The ATC tracking processor estimates residual measurements for the navigation filter from the I and Q data.

The I and Q measurements are functions of amplitude, navigation data bit, correlation function, and sine and cosine, respectively, of the phase error. The correlation function is a known function of the range error, and the noise on the Is and Qs is white, additive, unbiased, and Gaussian.

In one embodiment of the ATC tracking processor, the Is and Qs are first smoothed for a period of time. In one embodiment, such time period corresponds to the amount of time that the navigation data bit is expected to be constant (e.g., approximately 20 milliseconds). The smoothed Is and Qs are then passed through two nonlinear transformations configured according to their linearity and additive noise properties. Since the nonlinear transformations tend to increase the measurement noise relative to the Is and Qs, it is desirable to smooth the Is and Qs before applying the transformation.

The range residual transformation, made up of the early and late Is and Qs, produces a measurement that is a linear function of range residual error. The range rate residual transformation, made up of the prompt Is and Qs, produces a measurement that is a linear function of range rate residual error, however, the square of the correlation function remains as a multiplier. Both transformed measurements are also multiplied by the square of the I and Q amplitude. The noise on each is additive, zero mean, and white with a variance given by a deterministic equation dominated by the variance of the I and Q noise. To describe these transformed measurements and their noise statistics, the I and Q amplitude and noise variance are estimated.

The range and range rate transformed measurements, typically generated, for example, at a 20 millisecond rate, are processed in order to obtain residual error estimates at desired intervals for the navigation filter. In one embodiment, the residual error estimates are provided at approximately one second intervals. In one embodiment, a three-state phase error estimator processes the measurements. Since total phase scales to range through the carrier signal wavelength, knowledge of the phase error yields the desired residual measurements for the navigation filter.

The phase error states (phase, phase rate, and phase acceleration) are propagated assuming that the phase acceleration is constant. This results in a linear dynamic equation with a constant transition matrix. There are four measurements for each satellite, range and range rate for L1 and L2 signals. The range measurement matrix is a constant scaled by the I and Q amplitude, whereas the range rate measurement matrix is also scaled by the correlation function. Since this is a relatively slowly varying function, it is assumed constant over the one second processing interval. As previously stated, the measurement noise matrix in low signal to noise environments is dominated by the I and Q noise variance.

Given the above dynamics and measurement process, a linear, unbiased estimator can be realized using a Kalman filter. The primary approximation is due to the measurement noise, which is unbiased, additive, and white but not Gaussian. In one embodiment, the measurement noise variance in the filter is increased to account for this.

The constant, linear state transition and the linear, and approximately constant measurement relations, allow the phase error estimator to handle relatively large magnitude swings in the measurements in the presence of relatively high noise. It is the ability to estimate the statistics of the noise that allows the parameters in the phase error estimator to be adjusted properly.

The amplitude on the Is and Qs can rapidly change due to variations in antenna gain, radio frequency signal processing (amplifiers, mixers, filters), and the automatic gain control amplifier, which maintains a constant input to the analog to digital converter. A measurement of the amplitude can be obtained from the early and late Is and Qs, but it becomes noisy as the signal to noise ratio decreases. However, the satellite signal amplitude at the GPS antenna input is constant over a reasonable length of time.

In one embodiment, a one state, one measurement, Kalman filter is designed for the L1 and L2 signals for each satellite.

The approximately constant satellite signal amplitude at the antenna is the state to be estimated. The measurements are the noisy I and Q amplitudes calculated from the early and late Is and Qs. The measurements are related to the state by the total system gain from the antenna to the analog to digital converter. The total system gain is approximately known from design parameters and can be improved in real-time by calibration and temperature compensation.

When the interference noise is low, the I and Q amplitude measurement is projected back through the system gain to estimate the constant satellite signal amplitude. Then, when the noise increases, the satellite signal amplitude estimate is projected forward through the system gain to estimate the I and Q amplitude. This process produces an approximately nonrandom multiplier for the range and range rate residual error measurements during periods of high signal interference. This helps the phase error estimator perform properly in a relatively high noise environment.

The noise variance on the Is and Qs is computed in part by assuming that each satellite's processing channel has one correlator sufficiently away from the code that it contains only noise. Since the noise is either from the radio signal processing channel or from external interference, it is the same for all satellites. However, each satellite's code is a pseudo random sequence, which when correlated with the input noise, produces uncorrelated noise between the satellites with equal variance. In one embodiment, a running average filter is used to compute the noise variance using the noise correlator signals from all satellite channels.

BRIEF DESCRIPTION OF THE DRAWINGS

The various features and advantages of the invention will be apparent from the disclosure herein as illustrated in the accompanying drawings.

DETAILED DESCRIPTION

Figure 1:
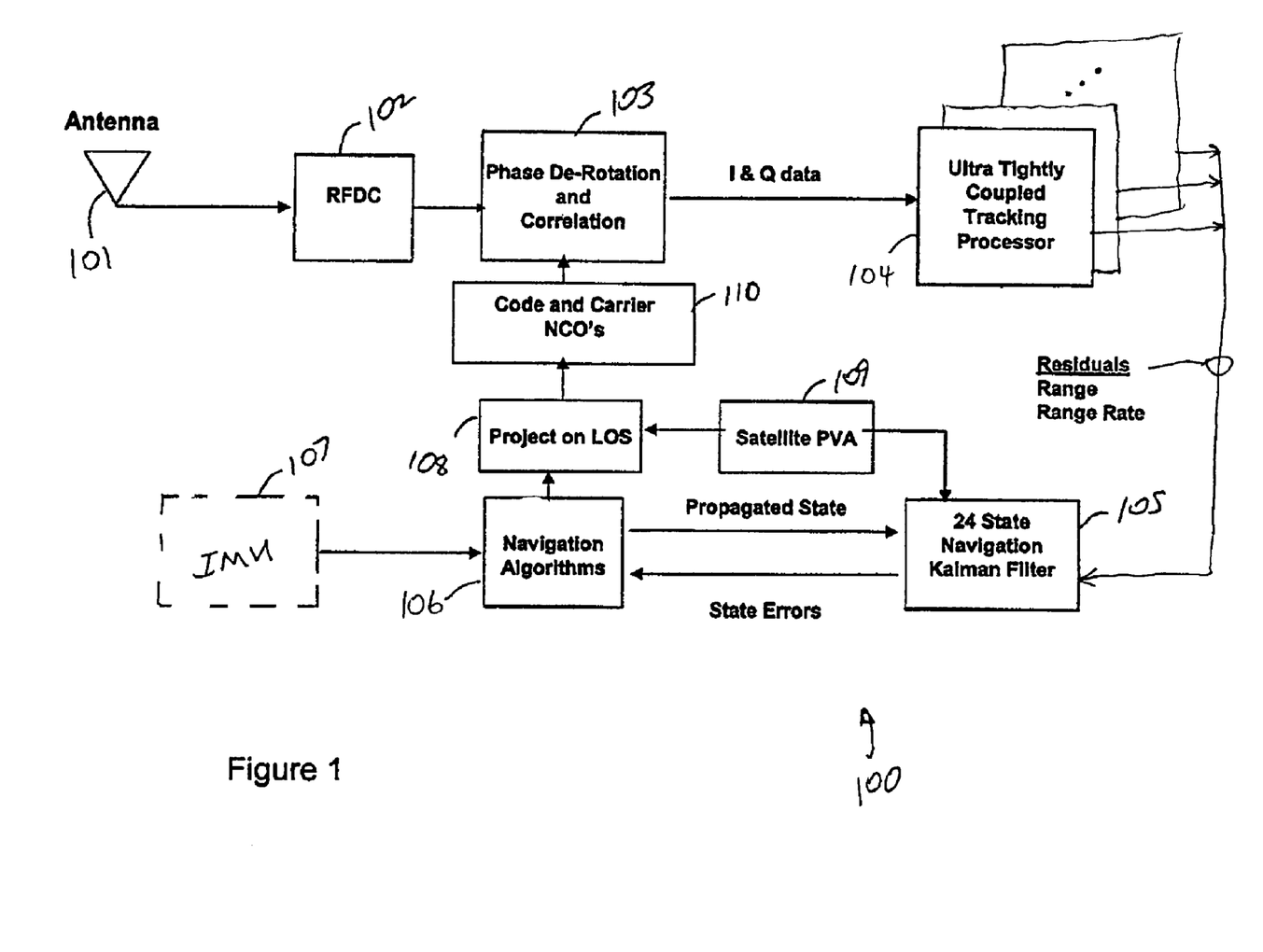
FIG. 1 is a block diagram of a system for coupling GPS and a navigation system that provides navigation data based on IMU measurements and/or dead reckoning estimates, etc.

FIG. 1 is a block diagram showing multi-satellite tracking system 100. In the system 100, satellite navigation signals are received by an antenna 101 and provided to a Radio Frequency Down Converter (RFDC) 102. Downconverted signals from the RFDC 102 are provided to a phase de-rotation and correlation block 103. De-rotated and correlated signals from block 103 are provided to an ATC tracking processor 104. In one embodiment, the ATC tracking processor 104 is configured as a multi-channel processor to allow simultaneous tracking of multiple satellites. The ATC tracking processor 104 provides residuals of range, range rate and range acceleration to a 24-state navigation Kalman filter 105. Navigation state errors from the Kalman filter 105 are provided to a navigation processor block 106. In one embodiment, inertial measurements from an optional IMU 107 are provided to the navigation processor block 106 and the inertial measurements are used by the navigation processor 106 to aid on computation of navigation estimates. The navigation processor 106 provides corrected navigation state information to a projection block 108 and propagated state information to the Kalman filter 105. Satellite Position, Velocity, and Acceleration (PVA) data are provided from a PVA block 109 to the projection block 108 and to the Kalman filter 105. The projection block 108 projects the navigation data onto the satellite line of sight and provides the projected data to a Numerical Controlled Oscillator (NCO) block 110. The NCO block 110 provides code and carrier NCO signals to the phase de-rotation and correlation block 103, thereby closing the code and carrier tracking loops.

In one embodiment, the navigation processor 106 uses dead reckoning to compute a navigation estimate over a desired time interval. In one embodiment, the system 107 comprises an Inertial Motion Unit and provides IMU measurements to the navigation processor 106 to allow the navigation processor to use a strapdown navigation algorithm to compute navigation estimates.

Figure 2:
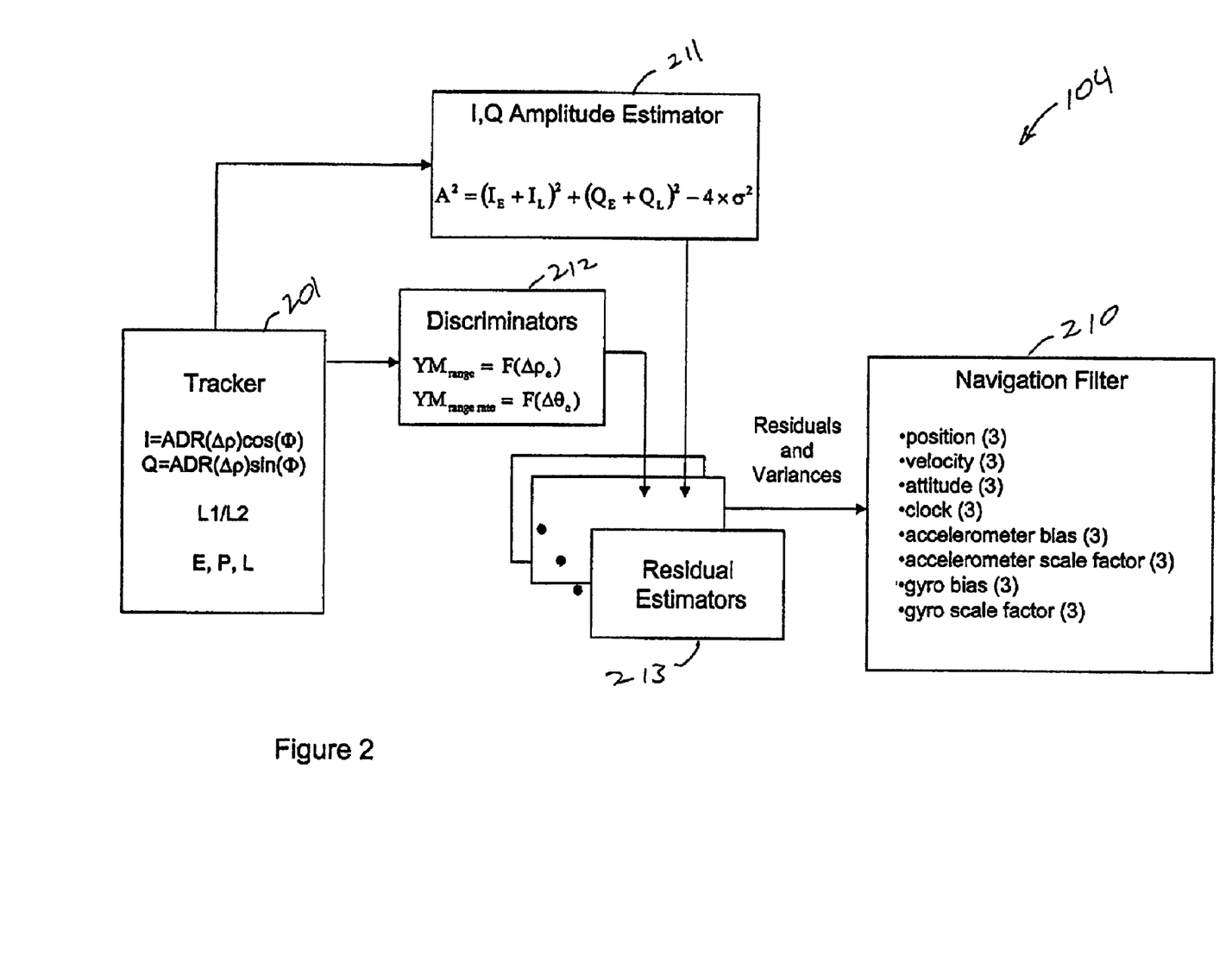
FIG. 2 is block diagram showing one embodiment of a channel of the tracking processor.

FIG. 2 is a block diagram of a channel of the ATC tracking processor 104. In the tracking processor 104, a tracker 201 provides early and late I and Q data to an amplitude estimator 211. The tracker 201 also provides data to one or more discriminators 212. The amplitude estimator 211 provides satellite signal amplitude estimates to one or more residual estimators 213. Residuals and variances are provided to a navigation filter 210. The navigation filter 210 computes error estimates for vehicle position, velocity, attitude, clock, accelerometer bias, accelerometer scale factor, gyro bias, and gyro scale factor.

In the system 100, all satellite signals and navigation estimates are combined in a single process to estimate the vehicle trajectory and associated system error parameters. This structure follows from a maximum likelihood estimator of GPS signal parameters.

The navigation filter 210 estimates vehicle state errors in position, velocity, attitude, clock and error parameters, and the like, at a relatively low rate. In one embodiment, the navigation filter 210 provides estimates at intervals of one second. The estimated vehicle angular rate and specific force measurements are compensated and adjusted using the estimated error parameters. The measurements are then integrated by the equations in the navigation processor block 106 to obtain vehicle position, velocity, and attitude estimates at a relatively higher rate (e.g., 100 Hz).

These estimates are projected along each satellite's line of sight to obtain range and range rate estimates, which are used to drive the carrier and code NCOs 110. The carrier NCO output is mixed with the GPS signal phase, resulting in a phase error, $\theta_e$. The code NCO 110 drives the code generator. The generator's output is correlated with the incoming GPS code, resulting in a correlation magnitude between zero and one.

This process generates the following I and Q functions for each satellite at the relatively higher rate (e.g., at a 1 KHz rate), for prompt (P), early (E), and late (L) signals:

$$I_P = A\, dR(\rho_e)\cos(\theta_e) + \eta_P$$

$$Q_P = A\, dR(\rho_e)\sin(\theta_e) + \epsilon_P$$

$$I_E = A\, dR(\rho_e - b/2)\cos(\theta_e) + \eta_E$$

$$Q_E = A\, dR(\rho_e - b/2)\sin(\theta_e) + \epsilon_E$$

$$I_L = A\, dR(\rho_e + b/2)\cos(\theta_e) + \eta_L$$

$$Q_L = A\, dR(\rho_e + b/2)\sin(\theta_e) + \epsilon_L$$

where:
$R(\rho_e) = \max[1 - (|\rho_e|/b), 0]$,
b=code chip in meters (=29.3 m for P code),
A=amplitude, different for L1 and L2, d=BPSK navigation data bit, constant for 20 ms,
$\rho_e$=residual (measurement−estimate) range error, meters,
$\theta_e$=L1 residual phase error, radians−different for L2
$\eta,\epsilon$=additive, white, Gaussian noise, zero-mean, variance $\sigma_{I,Q}^2$.

The additive, white, zero-mean, Gaussian noise is assumed to be uncorrelated (approximately) between Is and Qs at the same time.

In the tracking processor 201, the early and late Is and Qs are smoothed for a desired time period (e.g., 20 ms in one embodiment) while the data bit is assumed to be constant and assuming that $\rho_e$ and $\theta_e$ are relatively constant over that interval. The result has the same form as the above equations but with the noise variance changed to $$\sigma_{ELS}=\sigma_{IQ}/\sqrt{20}$$

In one embodiment, the prompt Is and Qs are smoothed for 10 ms each in a 20 ms interval to yield:

$I_P, Q_P, I_{PO}, Q_{PO}$ with noise variance $\sigma_{PS}=\sigma_{IQ}/\sqrt{10}$ To close the tracking loop through the navigation filter 210, the range and range rate residuals are computed by the residual estimators 213 and provided to the navigation filter 210. In one embodiment, the estimates are provided to the navigation filter 210 at approximately 1 Hz intervals. These residuals are estimated from the smoothed Is and Qs by first transforming them into measurements of $\rho_e$ and $\Delta\theta_e$ and then applying a Kalman filter to process the measurements to obtain the 1 Hz navigation filter residual estimates.

The ATC multi-satellite tracking system can estimate the vehicle's trajectory using estimates from the navigation system 107 and GPS measurements in the presence of broadband jamming noise. If the Is and Qs were directly employed as measurements to estimate residuals for the navigation filter, the phase error would render them ambiguous when it exceeded $2\pi$ radians. This corresponds to a maximum range residual of 0.19 meters (the wavelength of L1), which would easily be exceeded in the presence of any significant jamming noise. The following nonlinear transformations generate $\rho_e$ and $\Delta\theta_e$ measurements that are not ambiguous for large tracking errors.

Range residual measurements for L1 are given by:

$$Y_R = I_E^2 + Q_E^2 - I_L^2 - Q_L^2 \quad (1)$$
$$= A^2(2\rho_e/b) + \xi$$

for $$|\rho_e| \leq b/2$$

$E(\xi)=0$ $E(\xi^2)=8\sigma_{ELS}^4+4A^2\sigma_{ELS}^2 F(\rho_e)$ $F(\rho_e)=2\rho_e^2/b^2+\frac{1}{2}$ \quad (2)

Since $\frac{1}{2}\leq F(\rho_e)\leq 1$, a relatively conservative estimate is $F(\rho_e)=1$ Range rate residual measurements for L1 are given by:

$$Y_{RR} = I_P Q_{PO} - I_{PO} Q_P$$
$$= A^2 R^2(\rho_e)\sin(\theta_{eo} - \theta_e) + \gamma$$

For a small $\theta_e$ change over half an I, Q smoothing interval, $\Delta t/2$ $$Y_{RR} \approx -A^2 R^2(\rho_e)\dot{\theta}_e(\Delta t/2)+\gamma \quad (3)$$

$E(\gamma)=0$ $$E(\gamma^2)=2\sigma_{PS}^4+2A^2R^2(\rho_e)\sigma_{PS}^2 \quad (4)$$

for $|\rho_e|\leq b/2$, $0.25 \leq R^2(\rho_e) \leq 1$.

A similar measurement set is generated for the GPS L2 carrier signal, resulting in a total of four measurements at each smoothing time interval.

The above measurements, $Y_R$ and $Y_{RR}$, have desirable properties relative to estimating satellite residual errors for input to the navigation filter.

In a noiseless environment:

Residual range error=true range−estimated range=$\rho_e$= $(\lambda/2\pi)\theta_e$ \quad (5)

where $\lambda$ is the L1 carrier wavelength and $\theta_e$ is the L1 carrier phase error.

Further, in the noiseless environment:

Residual range rate error=true range rate−estimated range rate=$\dot{\rho}_e=(\lambda/2\pi)\dot{\theta}_e$ \quad (6)

The measurements $Y_R$ and $Y_{RR}$ are linear in $\rho_e$ and $\dot{\theta}_e$ respectively with coefficients that are functions of the I and Q amplitude, A. The dependence of $Y_{RR}$ on $R(\rho_e)$ is discussed below. The measurement noise terms, $\xi$ and $\gamma$, are additive, unbiased, and white. Although they are non-Gaussian, they can still be processed with a Kalman filter by slightly increasing the noise standard deviation.

The negative aspect of the nonlinear measurement transformations is that they significantly increase the measurement noise. For this reason, it is desirable to smooth the Is and Qs before they are transformed. The GPS navigation data bit rate of 50 Hz limits the smoothing interval to 20 ms for GPS systems.

When broadband jamming noise is present, the I and Q amplitude, A, can be relatively accurately estimated by an offline process. If the navigation filter could be run at 50 Hz instead of 1 Hz, then solving equations (1), (3) and (6) for $\rho_e$ and $\dot{\rho}_e$ yields residual error estimates that could be directly input to the navigation filter with appropriately modified measurement noise variances given by equations (2) and (4). The navigation filter's previous estimate of $\rho_e$ can be used to determine $R(\rho_e)$ in equations (3) and (4).

When the navigation filter is run at 1 Hz, which is its normal rate in an embedded processor, the 1 Hz measurement residuals are typically estimated from the 50 Hz measurements given by equations (1) and (3). This estimation can be performed by a Kalman filter which employs a relatively constant phase error acceleration model for its dynamics.

The L1 phase error estimator has states:

$$X=[\theta_e \dot{\theta}_e \ddot{\theta}_e]^T$$

where $\theta_e$=measured phase−navigation estimated phase for the GPS L1 frequency.

The state model is:

$\dddot{\theta}_e$=constant

The dynamics equation is therefore:

$$X(t_i)=F \cdot X(t_{i-1})$$

where:
F=Identity(3,3) and
$F(1,2)=F(2,3)=\Delta t$, $F(1,3)=\Delta t^2/2$ $\Delta t = t_i - t_{i-1}$ Since both L1 and L2 signals are assumed available, ionospheric error and error rate terms can be added to the state vector, $X_e$. These errors are observable because of the sign reversal in the code and carrier phase measurements. However, in a high jamming environment, ionospheric errors typically cannot easily be separated from the total phase measurements during this filter's one second processing time.

The measurement vector is given by:

$$Y(t_i) = [Y_R(f_1) \ Y_{RR}(f_1) \ Y_R(f_2) \ Y_{RR}(f_2)]^T$$

where:
$Y_R$ and $Y_{RR}$ are defined by equations (1) and (3), and
$f_1$ and $f_2$ represent GPS L1 (1575.42 MHz) and L2 (1227.6 MHz).

The measurement equation is:

$$Y(t_i) = H \cdot X(t_i) + \Gamma(t_i)$$

where:
$\Gamma(t_i) = [\xi_1 \ \gamma_1 \ \xi_2 \ \gamma_2]^T$, the first and second noise pairs correspond to L1 and L2,
H=Zeroes (4,3), and
$H(1,1) = (2A_1^2/b) \cdot (\lambda/2\pi)$,
$H(2,2) = -A_1^2 R^2(\hat{\rho}_e) \cdot \Delta t/2$
$H(3,1) = (2A_2^2/b) \cdot (\lambda/2\pi)$,
$H(4,2) = -A_2^2 R^2(\hat{\rho}_e) \cdot \Delta t/2 \cdot (f_2/f_1)$,
$A_1$ and $A_2$ correspond to I and Q amplitudes for L1 and L2 channels respectively, and
$\hat{\rho}_e$ represents the present best estimate of $\rho_e$ The measurement noise variance is given by $$R(t_i) = E(\Gamma \Gamma^T)$$

where:
R is diagonal since the noise terms are not correlated with each other,
R(1,1), R(3,3)=equation (2) for L1 and L2 respectively, and
R(2,2), R(4,4)=equation (4) for L1 and L2 respectively.

To completely determine the measurement process, the following values are estimated in blocks 211 and 213 as described below.
$\sigma_{IQ}^2$=variance of the additive noise on the Is and Qs
$A_1$ and $A_2$=I and Q amplitudes for L1 and L2

The operation of the phase error estimator for each satellite is described in the following paragraphs.

At discrete time intervals (e.g., one second intervals in one embodiment), the navigation filter generates new estimates of the vehicle trajectory, which through the navigation equations, run each of the satellite's NCOs. This causes the phase error states defined above to change. Therefore, the phase error estimator must be reinitialized after each navigation filter cycle.

The best estimate of the initial phase error states is zero. Thus:

$$\bar{X}(t_0) = [0 \ 0 \ 0]^T$$

The initial covariance matrix (diagonal), is determined by the maximum expected phase, phase rate, and phase acceleration errors at start of each one second interval.

$$\bar{P}(t_0) = E(\bar{X}(t_0) \bar{X}(t_0)^T)$$

After initialization, the measurements are processed at time $t_i$, i=0, ..., 49 (number of 20 ms measurements in a one second interval)

The estimated measurement vector is given by:

$$\bar{Y}(t_i) = H \cdot \bar{X}(t_i)$$

Before processing, each measurement is tested using the following algorithm, where $k_{res}$ an input parameter usually between three and ten.

```
E_res = sqrt[diag(H · P̄ · H^T + R)]
for i = 1,4 if |Y(t_i) - Ȳ(t_i)| ≧ k_res · E_rers
         H(i,i) = 0     Do not process the i^th measurement
    end
end
```

All measurements passing the above test, H(i,i)≠0, are processed by the following filter equations:

$$K(t_i) = \bar{P}(t_i) \cdot H^T \cdot [H \cdot \bar{P}(t_i) \cdot H^T + R]^{-1} \text{ Kalman filter gain matrix}$$

$$\hat{X}(t_i) = \bar{X}(t_i) + K(t_i) \cdot [Y(t_i) - \bar{Y}(t_i)] \text{ Generate new estimates}$$

$$\hat{P}(t_i) = [I - K(t_i) \cdot H] \cdot \bar{P}(t_i) \text{ Update Error Covariance matrix}$$

In the above equation, I is the identity matrix.

The system then checks for the end of the one second estimator processing interval as follows:

If $t_i$<1 second

Update estimate and covariance to next processing time $$\bar{X}(t_{i+1}) = F \cdot \hat{X}(t_i)$$

$$\bar{P}(t_{i+1}) = F \cdot \hat{P}(t_i) \cdot F^T + Q$$

Q (3×3)—represents state noise (usually set to zero to assure maximum smoothing of the measurement noise.

$i = i + 1$

Process the next measurement

If $t_i$=one second, then for each satellite, generate range and range rate residual measurements and accuracies for input to the navigation filter as follows:

$$DR = (\lambda/2\pi) \cdot \hat{X}(1), \ \sigma_{DR}^2 = (\lambda/2\pi)^2 \cdot \hat{P}(1,1)$$

$$DRR = (\lambda/2\pi) \cdot \hat{X}(2), \ \sigma_{DRR}^2 = (\lambda/2\pi)^2 \cdot \hat{P}(2,2)$$

It is not necessary to account for the correlation between $\hat{X}(1)$ and $\hat{X}(2)$ because it is almost always less than 0.2.

In one embodiment, each phase error estimator 213 is restarted after the navigation filter 210 has completed processing. There is some data loss with this process. Since the navigation filter 210 takes some finite time to run, the phase error estimators 213 have to operate in what remains of the one second interval after the navigation filter has stopped. Also, since the satellite signals 20 ms data bit boundaries do not arrive at the same time, not all of the phase error estimators 213 complete their last 20 ms processing before the navigation filter is ready to receive the inputs from the estimators 213.

In order to completely define the measurements and their associated accuracies given by equations (1) through (4), it is useful to compute an estimate of the I and Q amplitudes and noise variance. The amplitude measurement in the amplitude estimator 211 is given by $$A_M^2 = (I_E + I_L)^2 + (Q_E + Q_L)^2 - 4 \cdot \sigma_{ELS}^2$$
$$= A^2 + \beta$$

for $$|\rho_e| \leq b/2$$

where
$E(\beta)=0$
$E(\beta^2)=\sigma_{AM}^2=8 \cdot \sigma_{ELS}^2(2 \cdot \sigma_{ELS}^2+A^2)$ When there are no significant signals interfering, either intentionally or unintentionally, with the GPS signal, the noise variance, $\sigma_{ELS}^2$, is relatively low and a relatively good estimate of the amplitude can be made by smoothing $A_M^2$ over relatively short periods of time. However, broadband signal interference will increase the noise and, through the automatic gain control (AGC) amplifier, cause variations in the amplitude. Smoothing the measurement in this situation is typically not a viable option. The increased noise requires longer smoothing times but the amplitude variations limit smoothing times. One way to get around this situation is to identify something in the process that is relatively constant so that long term smoothing can be used.

It is assumed that for most of the visible satellites, the satellite signal amplitude at the GPS antenna remains relatively constant during periods of broadband jamming. If the antenna and RF chain are calibrated and temperature compensated, the gain from the input to the GPS antenna through the RF chain (amplifiers, bandpass filters, mixers, AGC amplifier) will be known to within several dB. A one-state Kalman estimator for the GPS L1 frequency can be configured as follows:

State:
$a^2$=satellite signal amplitude squared, assumed constant
State Model:

$$a_{i+1}^2 = a_i^2 + q_i, E(q_i)=0, E(q_i^2)=QE_i$$

The state noise with variance, QE, is included to account for some variations in satellite signal amplitudes as the vehicle moves and satellite orbits change. It can also be used to account for some unknown gain variations in the antenna and RF chain.

The amplitude measurement is expressed as $$A_M^2 = A_{i+1}^2 + \beta_{i+1}$$
$$= G_{i+1}^2 \cdot a_{i+1}^2 + \beta_{i-1}$$
$$E(\beta_{i+1}^2) = \sigma_{AM}^2 = RE_{i+1}$$

Where G is the total gain from the GPS antenna, through the RF chain, to I and Q generation. Typically G is known to less than 2 dB.

In one embodiment, the amplitude squared estimator 211 runs concurrently with the phase error estimator 213, but it is not reinitialized at one second intervals. Measurements are processed at 20 ms time intervals.

The initial measurement is used to generate the first estimate, which must be in low noise.

$$\overline{a^2}(t_i)=A_M^2/G_i^2$$

The initial covariance is given by:

$$\overline{PE}(t_i)=RE_i/G_i^4$$

The Kalman filter gain matrix is given by:

$$KE(t_i)=\overline{PE}(t_i) \cdot G_i^2 \cdot [\overline{PE}(t_i) \cdot G_i^4+RE_i]^{-1}$$

New estimated are computed from:

$$\hat{a}^2(t_i)=\overline{a^2}(t_i)+KE(t_i) \cdot [A_M^2(t_i)-G_i^2 \cdot \overline{a^2}(t_i)]$$

The new error covariance matrix is given by:

$$\hat{PE}(t_i)=[1-KE(t_i) \cdot G_i^2] \cdot \overline{PE}(t_i)$$

The updated estimate and covariance at the next processing time is:

$$\overline{a^2}(t_{i+1})=\hat{a}^2(t_i)$$

$$\overline{PE}(t_{i+1})=\hat{PE}(t_i)+QE_i$$

The amplitude estimator 211 continues processing measurements at each 20 ms timing cycle. A separate estimator is required for each satellite L1 and L2 signal.

The amplitude estimator 211 handles broadband interference noise. During periods of low noise, the amplitude measurement is projected back through the system gain to estimate the satellite signal amplitude. Then when the interference noise increases, the estimated satellite signal amplitude is projected forward through the system gain to estimate the I and Q amplitude. In this situation, the noisy I and Q amplitude measurement is smoothed using the constant satellite amplitude projected through the system gain.

GPS receivers typically have at least three correlators per satellite (early, prompt, and late) to aid in tracking each satellite's code. It is assumed that one additional correlator is available for I and Q noise estimation. In this correlator, the GPS signals are multiplied by the satellite's reference code which is offset by a significant time difference from the actual signal code. The correlator, therefore, outputs primarily noise.

Since all satellite signals at a specified frequency arrive at the correlators through the same, or similar, RF channel, their composite signal is corrupted by a single additive noise term. But because each satellite code is a different pseudo-random noise sequence, the correlation process causes the resulting I and Q noise sequences for different satellite channels to be approximately uncorrelated. Therefore, the I and Q noise variance can be estimated by averaging over time and across several satellite channels.

The noise is assumed to be zero mean, white, and Gaussian. Thus the only parameter to be estimated is the variance.

At time $t_j$ the I and Q noise variance computed from M satellite channels is $$\sigma_{IQ}^2(t_j) = (1/M) \sum_{i=1}^{M} (\eta^2(i,j) + \varepsilon^2(i,j))$$

where
$\eta(i,j), \varepsilon(i,j)$ represents noise on the Is and Qs for the $i^{th}$ satellite at time $t_j$
The noise estimate over N time points is $$\sigma_{IQ}^2 = (1/N) \sum_{j=1}^{N} \sigma_{IQ}^2(t_j)$$

A running average filter that approximates the above is $$\sigma_{IQ}^2 = \alpha \cdot \sigma_{IQ}^2 + (1-\alpha) \cdot \sigma_{IQ}^2(t_j) \text{ where } (1-\alpha)=1/N$$

The smoothing parameter, a, can be adjusted depending on the expected dynamics of the I and Q additive noise.

In one embodiment, the linearity of the discriminator measurements and the smoothing filter, and the configuration of the amplitude estimator allow the ATC to handle relatively large magnitude swings in the measurements due to noise. In one embodiment, the ATC can estimate the statistics of the noise that allows the parameters in the ATC to be adjusted properly. The system adapts to changing levels of interference and can operate without knowledge of the GPS navigation data bit. Since its design parameters are provided by application of linear estimation theory, the ATC can easily be integrated into existing navigation filter designs.

Figure 3:
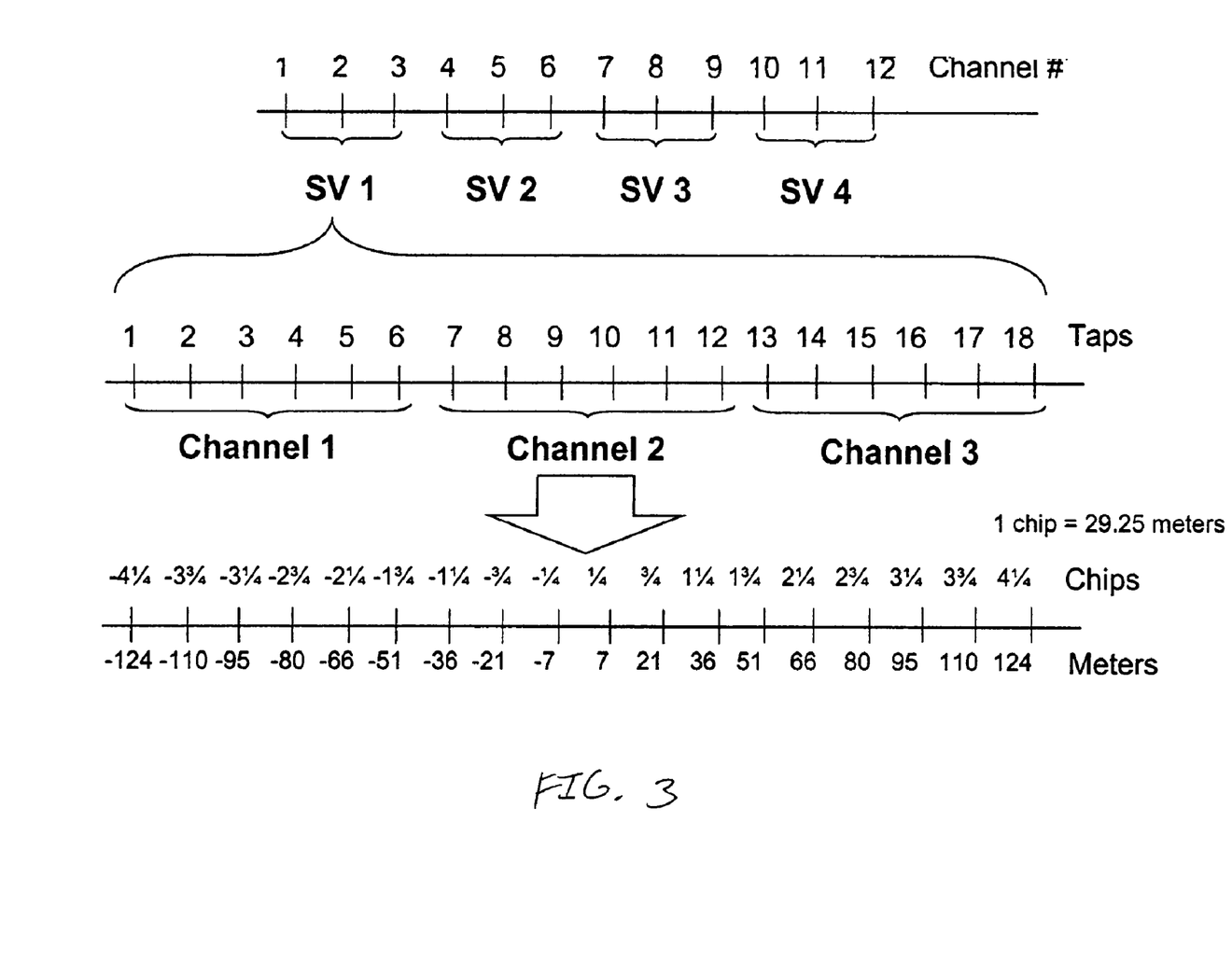
FIG. 3 illustrates one example of channel allocation during satellite acquisition in the advanced tight coupling system of FIG. 1.

FIG. 3 illustrates one example of channel allocation during satellite acquisition in the advanced tight coupling system 100. In FIG. 3, twelve channels are allocated such that channels 1-3 are designated to acquire a first satellite, channels 4-6 are designated to acquire a second satellite, channels 7-9 are designated to acquire a third satellite, and channels 10-12 are designated to acquire a third satellite. Each channel is configured with 6 taps thus providing parallel search of a desired range across 18 taps. In FIG. 3, the taps are spaced at ½ chip intervals such that the 6 taps of channel 1 are configured to search at chip offsets −4.25 through −1.75, the 6 taps of channel 2 are configured to search at chip offsets −1.25 through 1.25, and the 6 taps of channel 3 are configured to search at chip offset 1.75 through 4.25. FIG. 3 shows 3 channels per satellite, 6 taps per channel, and ½ chip spacing by way of example and not by way of limitation. One of ordinary skill in the art will recognize that more than three or less than three channels can be allocated to each satellite. Moreover, one of ordinary skill in the art will recognize that more than six or less than six taps can be provided for each channel and that the spacing between taps can be greater or less than ½ chip.

Each tap corresponds to an in-phase and quadrature phase (I and Q) output from the correlators 103 at designated time intervals. The Signal Power of each tap $A_i$ is computed as:

$$A_i = I_i^2 + Q_i^2$$

Sixteen residuals $D_i$ from the advanced tight coupling filters 104 are:

$$D_i = [\Delta\rho(I_{i-1}, I_{i+1}, Q_{i-1}, Q_{i+1}), \Delta\dot{\rho}(I_i, Q_i)]$$

where $\Delta\rho$ and $\Delta\dot{\rho}$ are the filter states as described above. For $A_m = \text{Max}(A_i)$, and a spacing of ½ chip between each tap:

$$Offset_m = (Tap_m - 9.5)\frac{29.25}{2} \text{ meters}$$

Thus, the satellite range residual for tap m is $Offset_m + \Delta\rho_m$ and the satellite range rate residual for tap m is $\Delta\dot{\rho}_m$.

By using the residuals available from the filters 104, the desired satellites can be acquired even in the presence of jamming. In one embodiment, each channel estimates the received signal strength and processes the I and Q data through the advanced tight coupling filters 104 for a desired satellite. The tap with the greatest signal strength is selected. Using the selected tap, and the two adjacent taps, the time bias is estimated using the sum of the channel offset and the range error estimates from the filters 104. This process is repeated (or run in parallel) for a second satellite. The receiver time bias is computed as the average of the time bias observed for the two satellites. In one embodiment the chip spacing between taps is selected to provide a desired receiver time bias accuracy. In this manner, the advantages provided by the advanced tight coupling filters 104 can be used to provide acquisition (as well as tracking) in the presence of jamming.

Although described in terms of specific embodiments, the scope of the invention is limited only by the allowed claims.

What is claimed is:

1. A method for acquisition in a satellite navigation system, comprising:
   providing a receiver, wherein the receiver comprises electronic hardware comprising at least a radio frequency downconverter, a tracker, and a tracking processor;
   receiving and amplifying radio navigation data embedded in noise, wherein receiving and amplifying are performed in the receiver;
   assigning a plurality of receiver channels of the tracker to search for a desired satellite, each receiver channel comprising a plurality of taps, said taps of each channel of the plurality spaced apart in time according to a desired chip spacing;
   extracting a range error measurement corresponding to each of said taps of the assigned plurality of channels, wherein extracting is performed by the tracking processor;
   extracting a velocity error measurement corresponding to each of said taps of the assigned plurality of channels, wherein extracting is performed by the tracking processor;
   identifying a designated tap corresponding to a maximum amplitude, wherein identifying is performed by the tracking processor,
   computing an offset corresponding to said designated tap, wherein computing is performed by the tracking processor; and
   computing a time bias based at least in part on said offset and a range residual corresponding to said designated tap, wherein computing is performed by the tracking processor.

2. The method of claim 1, wherein each receiver channel of the tracker is configured with 6 taps, wherein each of the assigned plurality of receiver channels comprises 3 receiver channels providing parallel searching across 18 taps, wherein the taps are spaced apart by ½ a chip.

3. The method of claim 2, further comprising 4 groups of assigned pluralities of receiver channels of 3 receiver channels each for parallel acquisition of 4 satellites using 12 receiver channels.

4. The method of claim 2, wherein the 3 receiver channels comprise a first receiver channel, a second receiver channel, and a third receiver channel, wherein the taps of the first receiver channel are configured to search at chip offsets −4.25 through −1.75, the taps of the second receiver channel are configured to search at chip offsets −1.25 through 1.25, and the taps of the third receiver channel are configured to search at chip offset 1.75 through 4.25.

5. The method of claim 1, further comprising distributing in time the receiver channels within the plurality of receiver channels assigned to search for the desired satellite such that the taps of the plurality are spaced apart at ½ chip intervals for parallel time search.

6. The method of claim 1, further comprising computing a corresponding range rate residual for the tight coupling from the extracted velocity error measurement, wherein computing is performed by the tracking processor.

7. The method of claim 1, wherein the receiver comprises a GPS receiver.

8. A method for acquisition in a satellite navigation system, comprising:

providing a receiver, wherein the receiver comprises electronic hardware comprising at least a radio frequency downconverter, a tracker, and a tracking processor;

receiving satellite navigation signals in the receiver;

assigning a plurality of receiver channels of the tracker to search for a satellite navigation signal of a particular satellite, each receiver channel of the plurality having a plurality of taps as outputs, said taps of the plurality spaced apart in time for parallel searching of the satellite navigation signal;

identifying a tap of the plurality having a maximum amplitude, wherein identifying is performed by the tracking processor, and computing a range residual corresponding to the time position of the identified tap for tight coupling of a navigation solution and the plurality of channels, wherein computing is performed by the tracking processor.

9. The method of claim 8, further comprising extracting a velocity error measurement from at least one tap of the plurality of receiver channels, and computing a corresponding range rate residual for the tight coupling, wherein extracting and computing are performed by the tracking processor.

10. The method of claim 8, wherein each receiver channel of the tracker is configured with 6 taps, wherein each of the assigned plurality of receiver channels comprises 3 receiver channels providing parallel searching across 18 taps, wherein the taps are spaced apart by ½ a chip.

11. The method of claim 10, further comprising 4 groups of assigned pluralities of receiver channels of 3 receiver channels each for parallel acquisition of 4 satellites using 12 receiver channels.

12. The method of claim 10, wherein the 3 receiver channels comprise a first receiver channel, a second receiver channel, and a third receiver channel, wherein the taps of the first receiver channel are configured to search at chip offsets −4.25 through −1.75, the taps of the second receiver channel are configured to search at chip offsets −1.25 through 1.25, and the taps of the third receiver channel are configured to search at chip offset 1.75 through 4.25.

13. The method of claim 8, wherein said taps of the plurality are spaced apart in time at ½ chip intervals.

14. The method of claim 8, wherein the receiver comprises a GPS receiver.

* * * * *